US006634553B2

(12) United States Patent
Reasoner et al.

(10) Patent No.: US 6,634,553 B2
(45) Date of Patent: Oct. 21, 2003

(54) METHOD AND APPARATUS FOR EVEN ILLUMINATION OF A TARGET FOR IMAGE CAPTURE

(75) Inventors: Kelly J Reasoner, Ft Collins, CO (US); Gregg S Schmidtke, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 09/814,269

(22) Filed: Mar. 21, 2001

(65) Prior Publication Data

US 2002/0134840 A1 Sep. 26, 2002

(51) Int. Cl.[7] .................................................. G06K 7/10
(52) U.S. Cl. ........................ 235/462.22; 235/462.01; 235/462.2; 235/462.21; 235/462.06; 235/462.23
(58) Field of Search ............................ 235/462.01, 462.2, 235/462.21, 462.22, 462.45, 454, 472.01

(56) References Cited

U.S. PATENT DOCUMENTS

| 4,945,429 A | | 7/1990 | Munro et al. |
| 5,280,161 A | * | 1/1994 | Niwa .................... 235/462.42 |
| 5,331,176 A | * | 7/1994 | Sant'Anselmo et al. .... 250/566 |
| 5,354,977 A | * | 10/1994 | Roustaei ................ 235/462.11 |
| 5,544,146 A | | 8/1996 | Luffel et al. |
| 5,545,886 A | * | 8/1996 | Metlitsky et al. ....... 235/462.42 |
| 5,581,071 A | * | 12/1996 | Chen et al. ............ 235/462.06 |
| 5,644,559 A | | 7/1997 | Christie, Jr. et al. |
| 5,682,096 A | | 10/1997 | Christie, Jr. et al. |
| 5,697,699 A | * | 12/1997 | Seo et al. .................... 362/252 |
| 5,852,288 A | * | 12/1998 | Nakazawa et al. ..... 235/472.01 |
| 6,039,255 A | * | 3/2000 | Seo ........................ 235/462.35 |
| 6,118,598 A | | 9/2000 | Gardner, Jr. |
| 6,138,909 A | * | 10/2000 | Rockwell et al. ........... 235/383 |
| 6,160,786 A | | 12/2000 | Coffin et al. |
| 6,164,543 A | | 12/2000 | Kato et al. |
| 6,194,697 B1 | | 2/2001 | Gardner, Jr. |
| 6,246,642 B1 | | 6/2001 | Gardner, Jr. et al. |
| 6,265,705 B1 | | 7/2001 | Gardner, Jr. |
| 6,331,714 B1 | * | 12/2001 | Gardner et al. ........ 250/559.29 |
| 6,366,707 B1 | | 4/2002 | Gardner, Jr. et al. |

FOREIGN PATENT DOCUMENTS

| EP | 1045328 A2 | 10/2000 |
| EP | 1045330 A2 | 10/2000 |

OTHER PUBLICATIONS

European Search Report for Serial No. 01126143.5 dated Jun. 11, 2002.

* cited by examiner

*Primary Examiner*—Michael G. Lee
*Assistant Examiner*—Ahshik Kim

(57) ABSTRACT

A method and apparatus use light sources, such as LEDs, to illuminate target areas. At least one embodiment of the invention provides a system for illuminating target areas using multiple light sources, wherein the system comprises a first light source configured to illuminate a first target area. The system further comprises a second light source configured to illuminate a second target area, wherein the second target area is located more distant from the second light source compared to the distance from the second light source to the first target area. According to at least one embodiment, the illumination from the first light source and the illumination from the second light source overlaps on the first target area, and the intensities of the first and second light source are adjusted to provide a relatively balanced illumination of the first target area.

21 Claims, 4 Drawing Sheets

METHOD AND APPARATUS FOR EVEN ILLUMINATION OF A TARGET FOR IMAGE CAPTURE

TECHNICAL FIELD

The field of the invention generally relates to the use of illumination in bar code readers and, more specifically, to controlling the intensity of the light emitting diodes (LEDs) that are used to illuminate a bar code target area.

BACKGROUND

Automatic data storage systems exist for use with computers and other systems. These systems typically consist of a storage area for storing data cartridges or other media and one or more drives for reading data from, or writing data to, the data cartridges. The data cartridges may be stored in one or more storage racks or "magazines." Each of the magazines is capable of holding a plurality of data cartridges. When a host computer needs to read data from, or write data to, a particular data cartridge, a cartridge access device is used to remove the desired data cartridge from its storage magazine, carry the cartridge to the appropriate drive, and insert the cartridge into the appropriate read/write drive. When the drive has completed its read/write operation or other processing, the cartridge access device is used to remove the tape cartridge from the drive and to return the cartridge to the appropriate magazine storage area.

Such data storage systems are often referred to as "jukebox" data storage systems. These jukebox systems can be sized according to the host system's requirements. For example, jukebox storage systems may range from small systems that have a single drive and less than ten data cartridges to systems having more than ten drives and more than a hundred data cartridges. The jukebox storage system has a control system that controls the cartridge access device that moves the data cartridges between the storage magazines and the read/write drives. The cartridge access device may include a cartridge engaging assembly or "picker" that is used to engage the cartridge and to move the cartridge between the storage magazine and the drive. The picker may be used to withdraw and replace the cartridge from the magazine and to insert and remove the cartridge from the drive. Such a system is disclosed in U.S. Pat. No. 6,160,786, entitled "Cartridge Engaging Assembly With Rack Drive Thumb Actuator System", the disclosure of which is hereby incorporated herein by reference.

SUMMARY OF THE INVENTION

A need exists for the cartridge engaging assembly or picker to identify specific data cartridges in the data storage system to ensure that the picker engages the correct cartridge. This may be accomplished by having the picker read a bar code label or other label that is affixed to the data cartridge. The data storage rack or magazine may consist of a number of slots for holding individual data cartridges. At times a magazine slot may be empty, such as when a data cartridge has already been moved to a read/write drive. Accordingly, there is also a need for the picker to detect when no data cartridge is present in a magazine slot.

The invention is directed to a method and apparatus for using light sources, such as LEDs, to illuminate target areas. At least one embodiment of the invention provides a system for illuminating target areas using multiple light sources, wherein the system comprises a first light source configured to illuminate a first target area. The system further comprises a second light source configured to illuminate a second target area, wherein the second target area is located more distant from the second light source compared to the distance from the second light source to the first target area. According to at least one embodiment, the illumination from the first light source and the illumination from the second light source overlaps on the first target area, and the intensities of the first and second light source are adjusted to provide a relatively balanced illumination of the first target area.

According to another embodiment of the present invention, a system for illuminating target areas is provided, which comprises a first light emitting array positioned to illuminate a primary target area. The system further comprises a second light emitting array positioned to illuminate a alternate target area, wherein the distance from the second array to the alternate target area is greater than the distance from the second array to the primary target area. The system also includes an illuminator lens positioned in relation to the second array so that light from the second array is directed across the primary target area to the alternate target area. According to such embodiment, the intensities of individual elements within the first and second arrays are adjusted to provide a relatively even distribution of light over the primary target area.

According to yet other embodiments of the present invention, a method for illuminating target areas using a plurality of light sources is disclosed. In at least one embodiment, such a method comprises illuminating a first target area with a first light source array. The method further comprises directing light from a second light source array toward a second target area, wherein the light from the second light source array passes over at least part of the first target area, thereby causing the first target area to be illuminated by both the first and second light source arrays. Further, the method includes adjusting the illumination levels of individual light sources within the first and second arrays so that the illumination over the first target area is relatively even.

DETAILED DESCRIPTION

Figure 1:
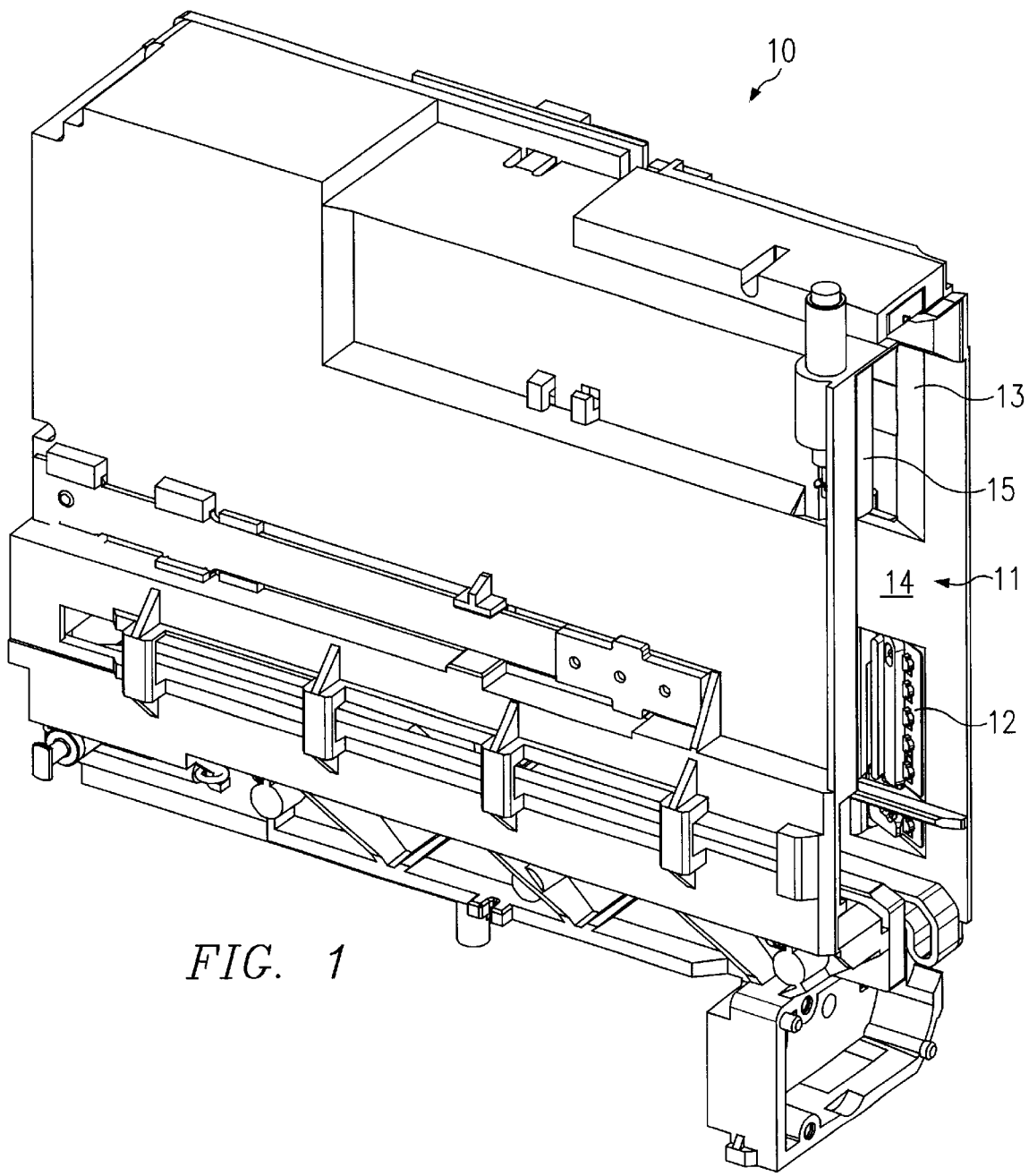
FIG. 1 is an orthogonal view of a partial picker assembly for a data storage system incorporating the present invention.

Various embodiments of the present invention provide a method and apparatus for using light sources, such as LEDs, to illuminate target areas. One embodiment of the system comprises a first light emitting array positioned to illuminate a primary target area and a second light emitting array positioned to illuminate a alternate target area. The primary target area is closer than the second target area, so that the light from the second light array passes across the primary target area to illuminate the alternate target area. Also, the distance from the second light array to the alternate target area is greater than the distance from the second light array to the primary target area. An illuminator lens is positioned in front of the second light array so that light from the second light array is directed across the primary target area to the alternate target area. The intensities of individual illumination within the first and second arrays are adjusted to provide a relatively even distribution of light over the primary target area.

The first light array may comprise, in one embodiment, a first bank of LEDs and a second bank of LEDs. The second light array comprises, in one embodiment, a third bank of LEDs and a fourth bank of LEDs. Each of the first through fourth bank of LEDs may comprise one or more individual LEDs. The first through fourth banks of LEDs are adjusted to provide relatively even distribution of light over the primary target area.

The present invention may be used in a data storage system. The data storage system may include a data storage media engaging assembly for engaging data storage media that are stored in the system. The data storage media are typically stored in slots of a storage magazine. The engaging assembly is movable so that the engaging assembly can be positioned in front of the slots in the storage magazine. The first and second LED arrays and the illuminator lens are mounted on the engaging assembly and positioned to illuminate labels on the data storage media.

The primary target area is a label area on the data storage media. The alternate target area is a rear area of a slot in the storage magazine. By detecting or reading the rear area of the slot, the system can detect when slots are empty.

The system further comprises a CCD that is positioned to receive light that is reflected from the primary target area or from the alternate target area or from both target areas. An imaging lens is positioned relative to the CCD to focus light that is received from the target areas onto the CCD. The imaging lens and CCD may be mounted on the data storage media engaging assembly along with the first and second LED arrays and the illuminator lens.

According to one aspect of the invention, an illumination array, for example an array of light emitting diodes (LEDs), are used to illuminate the label on a data cartridge. The light from the array is reflected off of the label, and the reflected light is then detected by a charge coupled device (CCD). The light array and CCD are mounted on the cartridge engaging assembly or "picker" in the data storage system. The light array is configured so that the illuminated label area is large enough to ensure that labels of different sizes can be read by the CCD. Additionally, a lens is used in conjunction with one or more of the light elements so that the rear of a magazine area can also be illuminated. This allows the CCD device to read the unique characteristics off the rear of an magazine slot. By detecting the rear of a magazine, the data storage system can determine when the picker is in front of an empty slot. For example, upon initialization of the data storage system, picker assembly 10 may review all of the magazines and storage racks to take an inventory of the data cartridges that are currently stored in the system.

FIG. 1 illustrates picker assembly 10, which functions as a data cartridge engaging device in a data storage system. Picker assembly 10 is moveable so that it can be positioned in front of data cartridges that are stored in magazines or racks in the data storage system. When picker assembly 10 is directed by the control system to move a data cartridge to a read/write drive, picker assembly 10 is moved so that cavity 11 is positioned next to the appropriate data cartridge. The cartridge can then be engaged by picker assembly 10. When the data storage system needs to move a data cartridge from one location to another, the data cartridge is moved out of the magazine and into cavity 11 in picker assembly 10. This can be accomplished, for example, by the system disclosed in U.S. Pat. No. 6,160,786. The data cartridge is then moved to the desired location within the data storage system by moving entire picker assembly 10. In this manner, the data cartridge may be moved between magazines, storage racks, read/write drives and/or other locations. It will be understood that picker assembly 10 can be adapted to work with data cartridges and other data storage media of any size or format.

The data cartridges preferably include a label, such as a bar code label, that can be detected and/or read by picker assembly 10 to find a desired cartridge. The bar code or other label is affixed to the data cartridge so that it is visible to picker assembly 10 when the cartridge is stored in a magazine. To assist in detecting and reading such labels, picker assembly 10 includes a CCD (not shown) and LED arrays 12, 13 that are mounted on picker lid 14, which forms one of the walls of the picker assembly. LED arrays 12, 13 provide illumination to the data cartridge label area. Light from the LED arrays is reflected off the bar code label and detected by the CCD. Illuminator lens 15 in front of LED array 13 is molded so that it functions to throw light from LED array 13 farther away from picker assembly than the light from LED array 12. This allows light to be reflected off of the back of a storage magazine when picker assembly 10 is positioned in front of an empty data cartridge storage slot.

Figure 2:
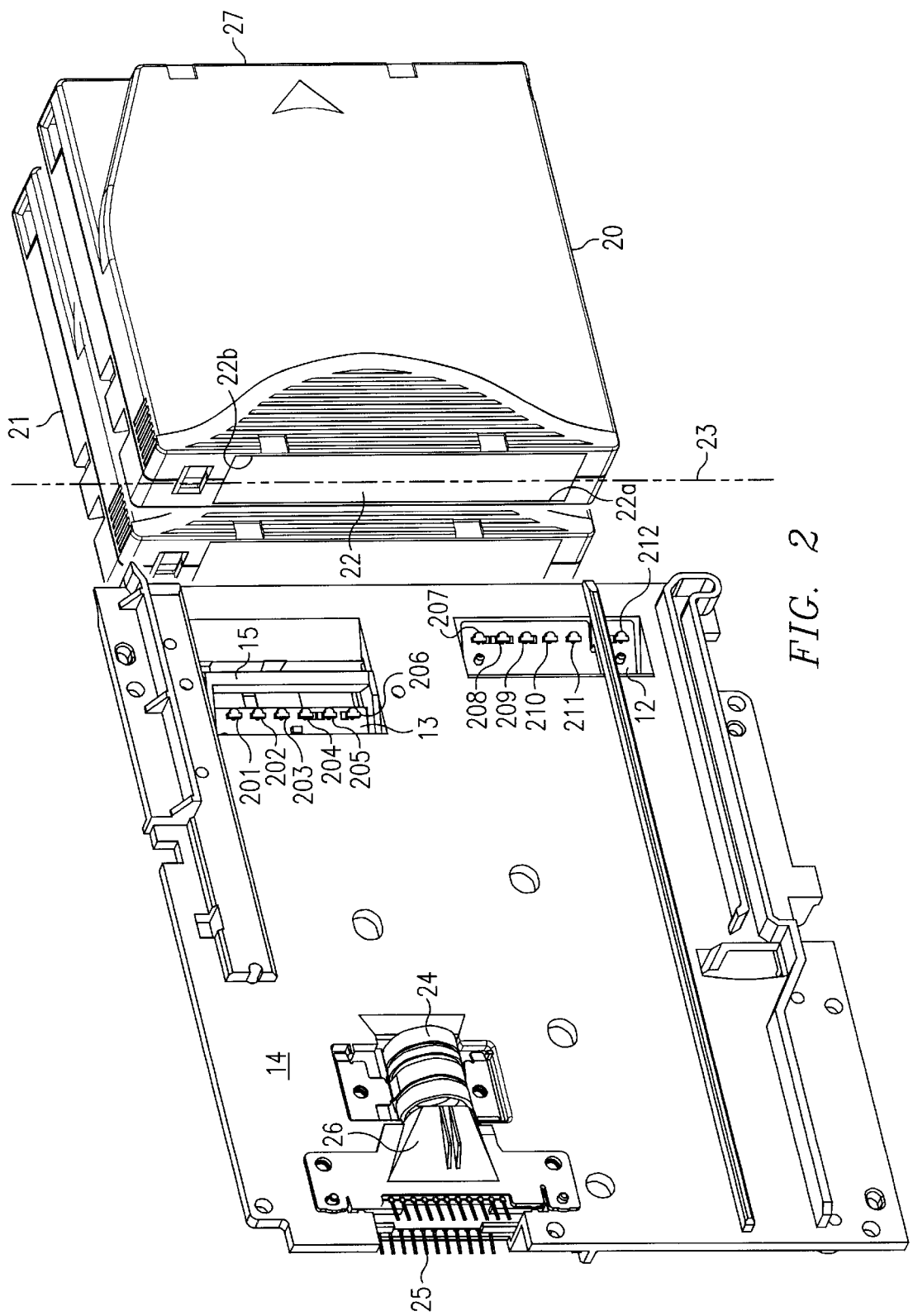
FIG. 2 is an orthogonal view of a picker lid section of the picker assembly shown in FIG. 1 show in spaced relation to a data cartridge.

FIG. 2 illustrates part of the interior of picker assembly 10. Picker lid 14 is shown in operational relationship to data cartridge 20, which may be stored in a magazine or storage rack (not shown) in the data storage system. It will be understood that in a preferred embodiment, other data cartridges, such as cartridge 21, will stored next to data cartridge 20 so that picker assembly 10 can be moved along a line of such cartridges. As picker assembly 10 moves down a line of cartridges, it reads the labels on data cartridges 20, 21.

As shown in FIG. 2, arrays 12, 13 are positioned to illuminate label area 22 on data cartridge 20. The rear portion of arrays 12, 13 is angled down relative to the plane of picker lid 14, so that the light from the individual light sources will be directed onto centerline 23 of label area 22 when picker assembly 10 is positioned in front of data cartridge 20. Light from arrays 12, 13 is reflected off of label area 22. This reflected light is focused by imaging lens 24 onto CCD 25. Shroud 26 between imaging lens 24 and CCD 25 prevents stray or ambient light from reaching CCD 25.

In a preferred embodiment, arrays 12, 13 each comprise 6 LEDs 201–206 and 207–212, respectively. LEDs 201–212 may be any light emitting device that provides sufficient light intensity to illuminate label area 22. The light produced by LEDs 201–212 must be constrained within certain limits to prevent saturating CCD 25 with too much light. In one embodiment, LEDs 201–212 are the LED identified as part number HSMC-S660 from Agilent Technologies, Inc. Relative to the position in which they are mounted on picker assembly 10, each of these LEDs throws light in a broad vertical pattern of approximately 120 degrees, as measured at the half power point, while constrained to a narrower horizontal pattern of approximately 45 degrees. The net effect of the light from LEDs 201–212 is illumination of label area 22.

When picker assembly 10 is positioned in front of data cartridge 20, light from LEDs 201–212 is reflected off of bar code area 22. When picker assembly 10 is positioned in front of an empty storage magazine slot, light, primarily from LEDs 201–206, is reflected off of the back of the magazine, which corresponds approximately to side 27 of tape 20. In either situation, the reflected light is gathered by imaging lens 24 and focused onto CCD 25. Imaging lens 24 is preferably a match triplet lens comprising three lenses that are configured to give the correct effect to the light that is provided to CCD 25.

In one embodiment, CCD 25 is the device identified by part number uPD3734A from NEC Corporation. This device consists of a 1×2660 array of light sensitive elements. The light sensitive elements are exposed to the focused light from imaging lens 24. CCD 25 detects a long thin vertical line of light oriented parallel to centerline 23. Each element of the CCD array generates a voltage that is proportional to the amount of light that is detected. These voltages are output to a processor or other device that processes the CCD voltage levels to detect the white spaces and dark bars of a bar code label. It will be understood that processing the output of a CCD device to detect a bar code is well known, although not trivial. Accordingly, such processing is not discussed further in the present description, other than to note that the complexity of the bar code reading algorithm is selected based in part upon the quality and evenness of the bar code illumination. A processor may be mounted on picker assembly 10 to receive and process the output of CCD device 25. Detected and decoded bar code label information can be passed to a main controller for the data storage system, which may direct picker assembly 10 to perform further actions, such as engaging a data cartridge or moving to a different location.

Once the bar code is detected, picker assembly 10 may engage data cartridge 20 to move it to another location, such as to a read/write drive. If the bar code is detected, but cannot be decoded, then picker assembly 10 can move left or right relative to data cartridge 20 to attempt to read the left edge 22a or right edge 22b of label area 22.

The following basic steps typically occur in a jukebox data storage system to read the bar code label on the data cartridges: an illumination source, such as an LED, provides light to the label area; light is reflected off of the label; the reflected light is focused by a lens onto a CCD; and the CCD outputs voltages from its light-sensitive array to a processor that identifies the contents of the label. The processor may process the voltages with a bar code detection algorithm that identifies the white spaces and dark lines of a bar code label. There are many variables involved with this process, such as the intensity of the light source, the reflectivity of the label, the diffusion of light reflected off of the label, the contrast between the label color and the color of the dark bars on the label, the focusing of the lens and the sensitivity of the detector.

Each of these variables can affect the system's ability to read the label. For example, the system may not be able to read the label if the light source is too dim or if the contrast between the label color and dark bars is too low. Low light situations can cause shadows on the label or result in a dim reflection off of the label, which makes it difficult to distinguish between black and white spaces on the label. Additional problems can result if the light source is too intense, if the label is too reflective, or if the label does not diffuse the reflected light sufficiently. These situations may cause a reflection that is too bright and can create bright spots on the label, which may saturate the CCD detector so that it cannot properly detect the dark bars.

Accordingly, there is a need in a label-reading system to provide an even distribution of sufficient light across the label area, without creating bright spots on the label and without saturating the label with light. The light source preferably provides substantially the same intensity of light across the label area. This provides the system with the best opportunity to decode the label. An uneven distribution of light makes it more difficult to decode the label, decreases the accuracy of the label reading, and requires the use of more complex decoding algorithms to interpret the label.

In a automatic data storage system, there is a need for picker assembly 10 to be capable of illuminating and detecting data from at least two areas relative to data cartridge 20. First, when picker assembly 10 stops in front of a data cartridge, it must be capable of detecting and reading a bar code label (or detecting the absence of a bar code label) at label area 22. Second, when picker assembly 10 stops in front of an empty magazine slot, it must detect the empty slot by "reading" the back of the magazine. When the back of the magazine is illuminated, the reflected light can be detected and processed by CCD 25. The back of the magazine has unique characteristics that the label processing algorithm can use to identify the slot as "empty."

In prior data storage systems, a single LED array was sufficient to provide illumination to read the bar code label on older data cartridges. However, the prior art LED arrays did not provide sufficient illumination to read longer labels in label area 22. In the present invention, LED array 12 is preferably and primarily used to illuminate label area 22, and LED array 13 is preferably and primarily used to read the back of the magazine. Illuminator lens 15 is designed to "throw" light from LED array 13 to the back of the magazine slot. Without using the light from LED array 13 and illuminator lens 15, CCD 25 cannot "read" the back of the storage magazine. Illuminator lens 15 may be constructed of a plastic material and can be molded to an appropriate shape so that the light that is generated by LEDs 201–206 is focused at the back of magazine rack, which is roughly equivalent to the distance to side 27 of data cartridge 20. Depending upon the type of storage media that is used in the data storage system, this distance may be approximately four inches from picker assembly 10. Of course, any other distances may be implemented in alternative embodiments, and any such implementations are intended to be within the scope of the present invention.

When picker assembly 10 is stopped in front of data cartridge 20, instead of an empty magazine, the addition of a second LED array has the beneficial effect of providing more illumination over bar code label area 22. However, because illuminator lens 15 is configured to direct or focus the light from LEDs 201–206 to the back of the magazine, the light from LEDs 201–206 that impinges upon label area 22 may be uneven. In one embodiment, illuminator lens 15 may be molded to deflect the light from LEDs 201–206 downward to illuminate the center area at the back of the magazine. This light deflection, which improves the illumination of the rear of the magazine, may also effect the evenness of the light that is reflected from label area 22.

The positioning of LED arrays 12, 13 may be affected by the physical arrangement and requirements of the other components of picker assembly 10. For example, the positioning of the thumb assembly (not shown), which is used to engage and move the data cartridges in and out of cavity 11, may affect the location of LED arrays 12, 13. As a result, it may not be possible to position LED arrays 12, 13 in an optimal location. As a result of a less than optimal positioning, the balance of light across label area 22 may be uneven if LEDs 201–212 were all set to the same intensity.

In the present invention, the intensity of individual LEDs 201–212 is varied to compensate for actual LED-array positioning and to compensate for the effects of illuminator lens 15. In a preferred embodiment, LEDs 201–212 are divided into four sets or "banks" of three LEDs each. Bank one is comprised of LEDs 201–203, bank two is LEDs 204–206, bank three is LEDs 207–209, and bank four is LEDs 210–212. The intensity of each bank of LEDs can be adjusted so that each bank can be set to a different intensity.

As discussed above, illuminator lens 15 draws the light from LED array 13 downward toward the center of the data cartridge. When combined with the light from LED array 12, this downward deflection of light from LED array 13 results in an overlap of light in the center of label area 22, which causes a bright spot on label area 22. Such a bright spot may affect the decoding of the bar code label. To compensate for this bright spot, LEDs 204–209 in banks two and three are set to a lower intensity to cause a more even distribution of light across label area 22.

The intensity of individual LEDs 201–212 may vary depending upon manufacturer and lot. In a preferred embodiment, the intensity of the LEDs is set when picker assembly 10 is manufactured so that the relative intensity of each LED bank is fixed. For example, bank two is set to a lower illumination than bank one. However, the overall level illumination of LEDs 201–212 can be varied during operation. For example, if picker assembly 10 is positioned in front of an empty slot, the intensity of LEDs 201–212 can be increased to better illuminate the rear of the magazine and thereby verify the absence of a data cartridge. However, when the overall intensity of LEDs 201–212 is increased, bank two remains at a lower intensity relative to bank one. The data storage system incorporates an algorithm that drives the overall brightness of LEDs 201–212.

FIGS. 3–6 are oscilloscope traces that represent the type of information that is output from a CCD in a prior art system and from CCD 25 in a system that incorporates the present invention.

Figure 3:
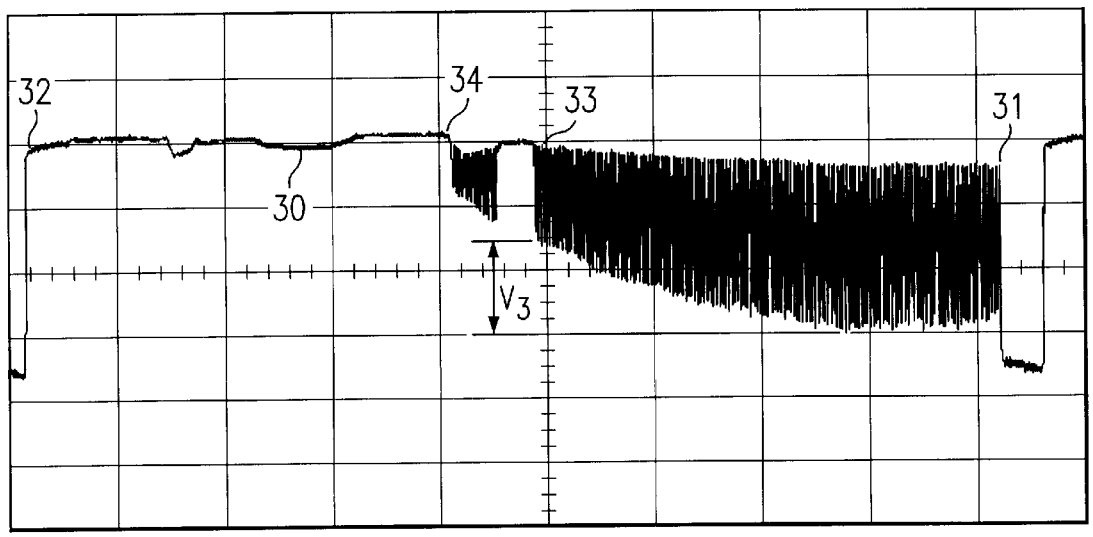
FIG. 3 is a trace representing the voltage output from a CCD in a prior art system for a 70 lppi target.
Figure 4:
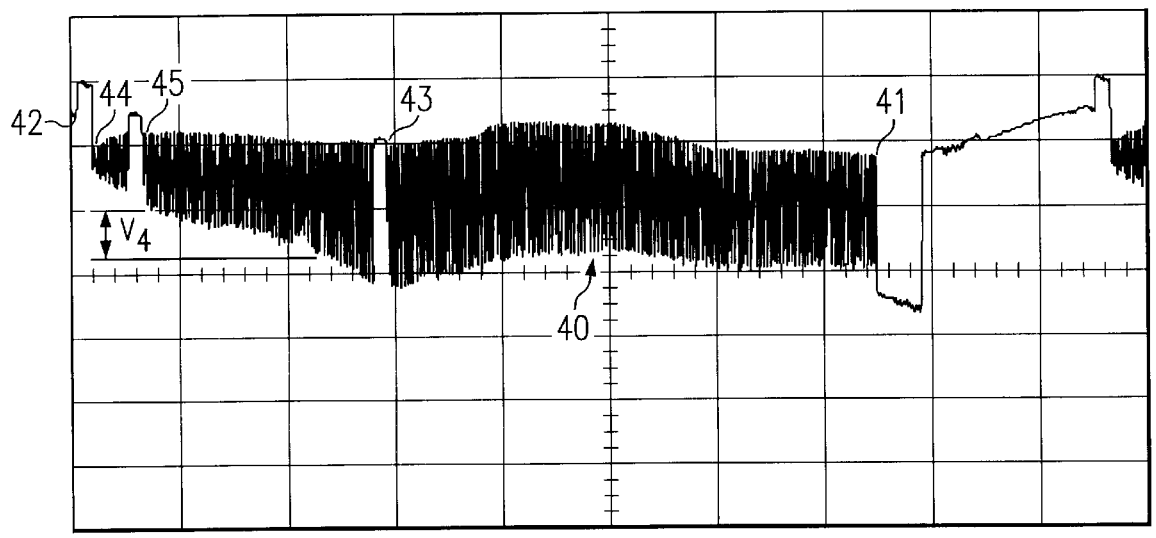
FIG. 4 is a trace representing the voltage output of a CCD of the present invention for a 70 lppi target.

FIG. 3 represents the type of information that is detected in a data storage system when a prior art picker assembly reads a bar code label having a 70 line pairs per inch (lppi) test pattern. A 70 lppi label has 70 black bars interleaved with 70 white spaces over each inch. The black bars and white spaces have even widths. Alternatively, FIG. 4 represents the information that is detected in a system that incorporates the present invention in which CCD 25 detects light reflected from the same 70 lppi test label. In FIG. 4, the 70 lppi test label is illuminated by LED arrays 12, 13.

In FIG. 3, trace 30 represents the voltage level output by a CCD when the prior art picker assembly reads label area 22. In general, the lower trace 30 drops, the whiter area is detected. The span of trace 30 between points 31 and 32 represents the entire CCD detection window. Point 31 corresponds to the upper edge of the detection window, and point 32 corresponds to lower edge of the detection window. The dark section at point 33 represents a strip of black tape that has been placed across label area 22 for reference. The distance between points 31 and 33 corresponds to the area that must be read to read a label on a Digital Linear Tape (DLT) type data cartridge.

As illustrated in FIG. 3, the prior art system is capable of illuminating a DLT label area. However, the prior art system does not illuminate the bottom portion of cartridge label area 22 as indicated by the low voltage trace between points 34 and 32. This low voltage trace corresponds to a lack of light being detected by that in lower detection window section of the CCD. The light sensitive elements in the lower part of the CCD detection area are not receiving sufficient light to create a voltage output. Accordingly, no information in that section of label area 22 is being detected in the prior art system.

FIG. 3 also illustrates the uneven illumination of label area 22 in the prior art system. Although a DLT label between points 31 and 33 would be illuminated by the system and detected by the CCD, the illumination is uneven. The uneven illumination is illustrated by the tapering off of the voltage between points 31 and 33, so that voltage difference $V_3$ is created between over the area between points 31 and 33. The label in this area has the 70 lppi test pattern. In an ideal system, the voltage would remain constant across the entire illuminated area representing the same pattern across the label. When the prior art data storage system decodes the bar code, the bar-code-reading algorithm that is used in the prior art system must compensate for this uneven illumination and the resulting uneven detection voltage.

In FIG. 4, trace 40 represents the voltage level output from CCD 25 in a system incorporating the present invention. The trace between points 41 and 42 represents the entire field of view for the detection window on CCD 25. Point 43, like point 33 in FIG. 3, represents a strip of black tape that has been placed across the label. The voltage trace between points 41 and 43 corresponds to the positioning of a DLT label. Clearly, in the present invention, light reflected from a DLT label would be detected by CCD 25.

Moreover, as illustrated in FIG. 4, in the present invention, LEDs 201–212 illuminate more of label area 22 when compared to the prior art system. Point 45 is another strip of black tape that has been placed across a lower portion of the test label. The distance between points 41 and 45 corresponds to the length of a label for a linear tape open (LTO) type of data cartridge. FIG. 4 illustrates that the present invention provides illumination for the entire area covered by an LTO label so that the LTO label can be detected and read by CCD 25.

As illustrated by comparing FIGS. 3 and 4, the prior art system is unable to read an entire LTO label because the illumination drops off at point 34, which is above the black tape that marks the bottom of a LTO label. Moreover, although the voltage level between points 41 and 45 tapers off slightly in FIG. 4, voltage difference $V_4$ across the LTO label area is less than voltage difference $V_3$ in the prior art system (FIG. 3). The illumination across the DLT label area in the present invention is more evenly distributed, as illustrated by the relatively flat variation in the detection voltage between points 41–43.

Figure 5:
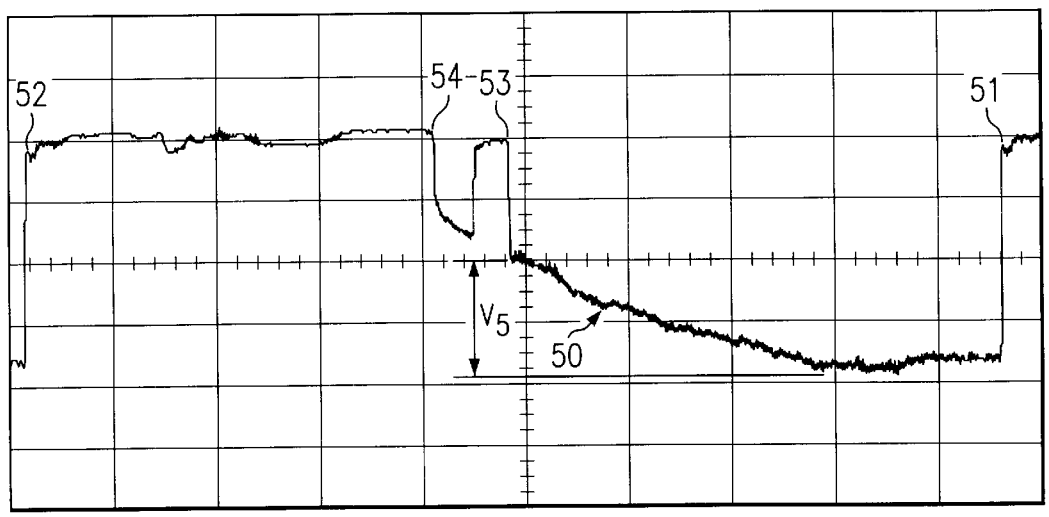
FIG. 5 is a trace representing the voltage output from a CCD in a prior art system for a white target.
Figure 6:
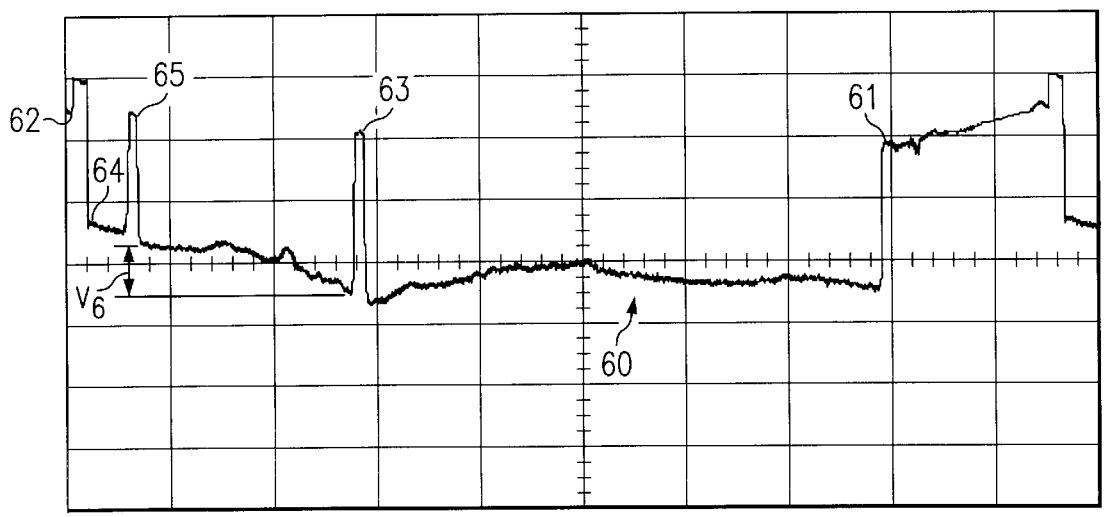
FIG. 6 is a trace representing the voltage output of a CCD of the present invention for a white target.

FIG. 5 is a trace illustrating the CCD output of a prior art system that is reading a white target in label area 22. FIG. 6 is a trace illustrating the output of CCD 25 when picker assembly 10 incorporating the present invention reads the same white target in label area 22.

Trace 50 in FIG. 5, like trace 3 in FIG. 3, illustrates the limited detection area of the prior art system. The prior art system generates a CCD output voltage only between points 51 and 54, which is approximately half of the CCD's detection area window 51–52. Additionally, in the DLT label area, between points 51 to 53, the illumination in the prior art system is uneven causing the CCD output voltage to taper off by voltage difference $V_5$.

In FIG. 6, trace 60 illustrates the output from CCD 25 when a white target in label area 22 is illuminated by the present invention. The area between points 61 and 62 corresponds to the detection window of CCD 25. Point 63 is caused by a black tape across the test label marking the end of a DLT label area, and point 65 is caused by a black tape across the test label marking the end of an LTO label area. Again, when compared to the prior art system's output in FIG. 5 for the same test label, the LEDs of the present invention illuminate a broader section of label area 22. Moreover, the illumination provided by LEDs 201–212 is more evenly balanced as illustrated by the relatively flat voltage difference $V_6$ across the length of the LTO label area.

It will be understood that although LEDs are used in the exemplary system described herein, the present invention can also be embodied in system that uses other sources of illumination, including, without limitation, lamps, lasers, Infrared Emitting Diodes (IRED), and other light sources. Moreover, the light sources used in the present invention may emit light of any wavelength, whether visible or not, as well as other electromagnetic waves. Correspondingly, although a CCD is used in the exemplary system described herein, the invention can be embodied using other light-sensitive integrated circuits or other electromagnetic detection devices that are capable of detecting the energy from the source of illumination.

It will be further understood that although the exemplary system described herein uses a bar code on the data cartridge label, the present invention can be used to illuminate other label formats and targets, whether the labels are part of a data storage system or any other system. Moreover, in systems using bar code labels, any bar code standard can be used on such labels, including, without limitation, uniform product code (UPC), POSTNET, European article number (EAN) codes, Japanese article number (JAN) codes, bookland codes, ISSN bar codes, Code 39, Code 128, Interleaved 2 of 5 code, Codabar codes, magnetic ink character recognition (MICR) codes, optical character recognition (OCR) codes, and other codes.

One of skill will also understand that the present invention can be used in any system that has a need to detect and read labels using an illumination source that provides light to be reflected off of a label and wherein the reflected light is detected by a detection device for further processing, without limitation to a data cartridge storage system. Moreover, when used in a data storage system, the present invention can be used with any form of data storage media.

What is claimed is:

1. A system for illuminating target areas using multiple light sources, comprising:
   a first light source configured to illuminate a first target area; and
   a second light source configured to illuminate a second target area, wherein the second target area is located more distant from the second light source compared to the distance from the second light source to the first target area;
   wherein the first target area is a label area on a data storage media, and wherein the second target area is a rear area of a magazine for holding the data storage media; and
   wherein the illumination from the first light source and the illumination from the second light source overlap on the first target area, and wherein the intensities of the first and second light source are adjusted to provide a relatively balanced illumination of the first target area.

2. The system of claim 1 wherein the first and second light sources are light emitting diodes (LEDs), and wherein the intensities of individual ones of the LEDs are adjusted to provide the relatively balanced illumination of the target area.

3. The system of claim 1 further comprising an illuminator lens positioned relative to the second light source so that the light from the second light source is generally focused on the second target area.

4. The system of claim 1 wherein the data storage media label area comprises a bar code label.

5. The system of claim 1 further comprising:
   a charge coupled device (CCD) positioned to detect light reflected from either the first target area or from the second target area or from both areas.

6. The system of claim 1 wherein said first target area and said second target area are not coplanar.

7. A system for illuminating target areas, the system comprising:
   a first light emitting array positioned to illuminate a primary target area;
   a second light emitting array positioned to illuminate a alternate target area, wherein the distance from the second array to the alternate target area is greater than the distance from the second array to the primary target area wherein said primary target area and said alternate target area are not coplanar; and
   an illuminator lens positioned in relation to the second array so that light from the second array is directed across the primary target area to the alternate target area;
   wherein the intensities of individual elements within the first and second arrays are adjusted to provide a relatively even distribution of light over the primary target area.

8. The system of claim 7 wherein:
   the first array comprises a first bank of LEDs and a second bank of LEDs;
   the second array comprises a third bank of LEDs and a fourth bank of LEDs; and wherein the first through fourth banks of LEDs are individually adjusted to provide the relatively even distribution of light over the primary target area.

9. The system of claim 7 further comprising:
   a data storage media engaging assembly for engaging data storage media that are stored in slots of a storage magazine, wherein the first and second arrays and the illuminator lens are mounted on the engaging assembly and wherein the engaging assembly is movable so that the engaging assembly can be positioned in front of the slots in the storage magazine.

10. The system of claim 9 wherein the primary target area is a label area on the data storage media, and wherein the alternate target area is a rear area of a slot in the storage magazine.

11. The system of claim 7 further comprising:
   a charge coupled device (CCD) that is positioned to receive light that is reflected from the primary target area or from the alternate target area or from both target areas.

12. The system of claim 11 further comprising:
   an imaging lens positioned to focus light that is received from the target areas onto the CCD.

13. The system of claim 12 further comprising:
   a data storage media engaging assembly for engaging data storage media that are stored in slots of a storage magazine, wherein the first and second arrays, the illuminator lens, the CCD and the imaging lens are mounted on the engaging assembly, and wherein the engaging assembly is movable so that the engaging assembly can be positioned in front of the slots in the storage magazine.

14. A method for illuminating target areas using a plurality of light sources, comprising:

illuminating a first target area with a first light source array;

directing light from a second light source array toward a second target area, wherein said first target area and said second target area are not coplanar, and wherein the light from the second light source array passes over at least part of the first target area, thereby causing the first target area to be illuminated by both the first and second light source arrays; and adjusting the illumination levels of individual light sources within the first and second arrays so that the illumination over the first target area is relatively even.

15. The method of claim 14 further comprising:

detecting light that is reflected from the first target area; and processing the detected light to decode the information detected at the first target area.

16. The method of claim 15 further comprising:

focusing the reflected light onto a detecting device.

17. The method of claim 14 wherein the first target area comprises a label area on a data storage media, and wherein the second target area comprises an area at the rear of a data storage media magazine.

18. The method of claim 17 wherein the individual light sources within the first and second arrays are adjusted so that an entire bar code label in the label area is relatively evenly illuminated when one of the data storage media is present in the magazine.

19. The method of claim 17 wherein the overall intensity of the first and second light sources is increased when one of the data storage media is not present in the magazine, thereby allowing the light from the second target area at the rear of the magazine to be detected.

20. The method of claim 14 wherein the first and second light source arrays comprise light emitting diodes (LEDs).

21. A method for illuminating target areas using a plurality of light sources, comprising:

illuminating a first target area with a first light source;

directing light from a second light source toward a second target area, wherein the second target area is located more distant from the second light source compared to the distance from the second light source to the first target area, and wherein the light from the second light source passes over at least part of the first target area, thereby causing the first target area to be illuminated by both the first and second light sources;

wherein the first target area is a label area on a data storage media, and wherein the second target area is a rear area of a magazine for holding the data storage media; and adjusting the intensities of the first and second light source to provide a relatively balanced illumination of the first target area.

* * * * *